(12) United States Patent
Moeller et al.

(10) Patent No.: US 9,651,019 B2
(45) Date of Patent: May 16, 2017

(54) ARRANGEMENT TO ALIGN A PART OF A WIND TURBINE

(71) Applicant: SIEMENS AKTIENGESELLSCHAFT, München (DE)

(72) Inventors: Jesper Moeller, Brande (DK); Jacob Groenvald Nielsen, Aarhus V (DK); Kenneth Helligsoe Svinth, Aarhus C (DK)

(73) Assignee: SIEMENS AKTIENGESELLSCHAFT (DE)

( * ) Notice: Subject to any disclaimer, the term of this patent is extended or adjusted under 35 U.S.C. 154(b) by 134 days.

(21) Appl. No.: 14/726,910

(22) Filed: Jun. 1, 2015

(65) Prior Publication Data

US 2016/0084220 A1 Mar. 24, 2016

(30) Foreign Application Priority Data

Sep. 22, 2014 (EP) ..................................... 14185827

(51) Int. Cl.
*F03D 1/00* (2006.01)
*G01B 5/25* (2006.01)
(Continued)

(52) U.S. Cl.
CPC .............. *F03D 1/001* (2013.01); *F03D 13/10* (2016.05); *F03D 13/20* (2016.05); *G01B 5/25* (2013.01);
(Continued)

(58) Field of Classification Search
CPC .................................. F03D 1/001; G01B 5/25
(Continued)

(56) References Cited

U.S. PATENT DOCUMENTS 7,194,820 B2 * 3/2007 Schweiger ............. B21D 28/12
29/465
8,720,140 B2 * 5/2014 Petta ..................... E04F 11/104
52/302.3
(Continued)

FOREIGN PATENT DOCUMENTS

CN 203335331 U 12/2013
EP 2667017 A 11/2013
(Continued)

OTHER PUBLICATIONS

Extended European Search Report for Application No. 14185827.4, mailed on Mar. 18, 2015.

*Primary Examiner* — Christopher Fulton
(74) *Attorney, Agent, or Firm* — Schmeiser Olsen & Watts LLP

(57) ABSTRACT

An arrangement and a method to align a part of a wind turbine to a counterpart is provided. The arrangement includes an alignment tool. The alignment tool includes a first area to be connected to a part of the wind turbine, and a second area that protrudes over the physical dimensions of the part of the wind turbine. The second area is arranged and prepared in a way that it abuts on the counterpart during the alignment of the part of the wind turbine and its counterpart. The arrangement includes a second alignment tool. The second alignment tool protrudes less far over the physical dimensions of the part of the wind turbine then the first alignment tool. Thus the first alignment tool abuts to the counterpart before the second alignment tool when the part of the wind turbine approaches the counterpart.

12 Claims, 2 Drawing Sheets

(51) Int. Cl.
*F03D 13/20* (2016.01)
*F03D 13/10* (2016.01)

(52) U.S. Cl.
CPC ... *F05B 2230/604* (2013.01); *F05B 2240/912* (2013.01); *Y02E 10/728* (2013.01); *Y02P 70/523* (2015.11)

(58) Field of Classification Search
USPC .......................................... 33/533, 645, 613
See application file for complete search history.

(56) References Cited

U.S. PATENT DOCUMENTS

| | | | | |
|---|---|---|---|---|
| 8,898,991 | B2* | 12/2014 | Cai | E04H 12/08 248/678 |
| 9,127,650 | B2* | 9/2015 | Moestrup | E04H 12/00 |
| 9,446,446 | B2* | 9/2016 | Gabeiras | B21K 3/04 |
| 2002/0043038 | A1* | 4/2002 | Cerrato | E04B 1/703 52/604 |
| 2012/0066884 | A1* | 3/2012 | Daeschner | B23P 19/00 29/447 |
| 2013/0236316 | A1* | 9/2013 | Bitsch | F03D 1/001 416/204 R |
| 2014/0007526 | A1* | 1/2014 | Wright | E04F 15/02183 52/127.4 |
| 2014/0175038 | A1* | 6/2014 | Arlaban Gabeiras | E04H 12/00 212/195 |
| 2014/0237932 | A1 | 8/2014 | Moestrup et al. | |
| 2015/0285225 | A1* | 10/2015 | Ollgaard | E04H 12/085 52/105 |
| 2016/0327016 | A1* | 11/2016 | Neumann | B66D 3/14 |
| 2016/0348650 | A1* | 12/2016 | Moeller | F03D 13/20 |

FOREIGN PATENT DOCUMENTS

| | | |
|---|---|---|
| JP | 2014001595 A | 1/2014 |
| WO | WO 2012034564 A1 | 3/2012 |
| WO | WO 2013027048 A1 | 2/2013 |
| WO | WO 2014075686 A1 | 5/2014 |
| WO | WO 2014075687 A1 | 5/2014 |

* cited by examiner

ARRANGEMENT TO ALIGN A PART OF A WIND TURBINE

CROSS-REFERENCE TO RELATED APPLICATIONS

This application claims priority to European Application No. EP14185827.4, having a filing date of Sep. 22, 2014, the entire contents of which are hereby incorporated by reference.

FIELD OF TECHNOLOGY

The following relates to an arrangement and a method to align a part of a wind turbine to a counterpart, and the use of the arrangement.

BACKGROUND

Towers, such as wind turbine towers for example, are made of steel or concrete. The tower is manufactured in a manufacturing site and transported to the installation site. There, the tower is erected and connected to a foundation.

The tower can be manufactured in one piece, or it can comprise several segments. In the case of tower segments, the segments are transported to the installation site and are connected at the installation site.

The tower segments can be connected before the tower is erected and connected to the foundation. It is also possible to connect the lowest tower segment to the foundation. Additional tower segments are attached to the first segment after the first segment is connected to the foundation.

The tower segments are fixed to the foundation or to another tower segment by bolts, for example.

During the installation of the tower or the tower segments, the connection interface between parts of the tower or between a part of the tower and the foundation need to be aligned.

It is known to use guiding means to assist in aligning the parts of the tower.

JP 2014001595 A discloses an assembly of a concrete column, which is with an upper pillar made from prestressed concrete having a tapered surface, and a lower column having a tapered surface. A tapered guiding means is used for coupling the columns. The guiding means for couplings is inserted over the tapered surface of a lower column from the upper pillar.

The guiding means can only be used at tapered tower walls.

CN 203335331 U describes a guiding means for aligning a tower cylinder with a flange with bolt holes. The guiding means have a pin rod and pin cap, whereby one end of pin rod is cone-shaped. The other end is welded to a pin cap. The diameter of the pin is the same as the diameter of a bolt for the flange of the wind turbine tower cylinder. The guiding means use a bolt hole in the flange.

EP 2667017 A describes an aligning tool in the field of wind turbines for aligning a hole with a fastener. The first section is adapted for connecting to the fastener and the second section having an outside diameter tapering down in a direction away from the first section. The aligning tool is connected to the fastener and can easily catch a corresponding hole.

The installation of a tower or tower segment with the guiding means described is carried out with the assistance of personnel. Thus humans are present in the area of the tower where the tower segments are connected. The workers assist in aligning the tower. This shows the disadvantage of injuries, as the tower segments are heavy and the movement of the tower segment is influenced by wind and thus not completely controllable.

SUMMARY

The embodiments of the invention provide an improved guiding means, a method to align a tower, and the use of the arrangement.

An arrangement to align a part of a wind turbine to its counterpart is described, whereby the arrangement comprises an alignment tool. The alignment tool comprises a first area to be connected to a part of the wind turbine, and a second area that protrudes over the physical dimensions of the part of the wind turbine.

The second area is arranged and prepared in a way that it abuts on the counterpart during the alignment of the part of the wind turbine and its counterpart.

The arrangement comprises a second alignment tool, whereby the second alignment tool protrudes less far over the physical dimensions of the part of the wind turbine then the first alignment tool, so that the first alignment tool abuts to the counterpart before the second alignment tool when the part of the wind turbine approaches the counterpart.

During the installation of a wind turbine a part of the wind turbine is aligned to its counterpart, to be connected to the counterpart in a predetermined position.

The part of the wind turbine might be a wind turbine tower or a wind turbine tower segment, or a nacelle, and the counterpart is a transition piece or a wind turbine tower segment, for example.

The parts of the wind turbine are big in size and are therefore transported to the installation site of the wind turbine separately. The parts of the wind turbine are then connected to form the wind turbine.

An arrangement is described to be used for the alignment of the part of the wind turbine to its counterpart. The arrangement comprises an alignment tool that is connected to the part of the wind turbine. The alignment tool is connected to the part of the wind turbine for the installation of the wind turbine and can be removed after the part of the wind turbine is aligned to its counterpart and the alignment tool is no longer needed. The alignment tool can then be used again in an alignment situation.

The alignment tool is connected to the part of the wind turbine with a first area, whereby a part of the alignment tool protrudes over the physical dimensions of the part of the wind turbine.

The physical dimensions of the part of the wind turbine are defined by the length the width and the height of the part, and are limited by the outer boundary of the part of the wind turbine.

This means that the alignment tool stands out or projects over the rim of the part of the wind turbine.

The part of the alignment tool that protrudes over the part of the wind turbine comprises a second area that is provided to abut to the counterpart of the part of the wind turbine. This means that it is planned to come in direct contact to the counterpart during the alignment of the part of the wind turbine and the counterpart. The second area of the alignment tool is located at a side of the alignment tool, so that the alignment tool abuts on the counterpart in a lateral movement.

A lateral movement is a movement that is mainly perpendicular to the shortest distance between the part of the wind turbine and the counterpart. In the case of the installation of a tower to a foundation, the shortest distance between the tower and the foundation is mainly vertical, e.g. in the direction of the longitudinal axis of the tower, the lateral movement is then a movement in a horizontal direction. The alignment tool is then an arrester to stop and/or hinder a lateral movement of the part of the wind turbine in one direction, which is a lateral direction.

A second alignment tool is connected to the part of the wind turbine that protrudes over the physical dimensions of the part of the wind turbine in mainly the same direction as the first alignment tool, but less far. Thus the second alignment tool is shorter than the first alignment tool, in terms of the part projecting over the rim of the part of the wind turbine.

An installation situation at a wind turbine can be, for example, that a segment of a tower is planned to be connected to a transition piece, or a nacelle is going to be connected to a tower. The tower segment or the nacelle would then be lifted by a crane to be lowered to the transition piece or the tower, in order to connect the parts.

The tower segment or the nacelle needs to be precisely positioned in order to be connected. The part of the wind turbine is connected to the crane by a rope and might experience a certain movement due to wind or the crane's movement.

During the installation, and in order to connect the part of the wind turbine to the counterpart, the part of the wind turbine is brought closer to the counterpart.

The first and the second alignment tool project from the part of the wind turbine mainly in the same direction, namely in the direction towards the counterpart. The first alignment tool projects longer out and comes into contact with the counterpart first. It abuts on the counterpart before the second alignment tool.

The first alignment tool abuts on the counterpart of the part of the wind turbine and prevents a further movement between the part of the wind turbine and the counterpart in a first direction.

The part of the wind turbine is then brought even closer to the counterpart. Then the second alignment tool abuts on the counterpart of the part of the wind turbine. The second alignment tool prevents a further movement between the part of the wind turbine and the counterpart in a second direction.

Thus, the pendular movement of the part of the wind turbine is eliminated and the part of the wind turbine can more easily be connected to the counterpart.

The part of the wind turbine can then be brought close to its counterpart, and the parts can be connected.

In addition no human interference with the part of the wind turbine is necessary to align it with its counterpart. Thus the installation is safer for the workers.

In an embodiment of the invention, the alignment tool is bendable to elastically flex when a force is acting on the second area.

At least one of the second alignment tools is elastically flexible, so that the alignment tool bends in the case that a force is acting on the alignment tool. The force might be introduced by the counterpart of the part of the wind turbine. The flexibility of the alignment tool makes it possible, that the alignment tool gives way to the counterpart, when the force that is acting on the alignment tool is too high.

Thus, the alignment tool is not damaged when the force acting on the tool are too high. The alignment tool can easily flex and thus will not suffer damage.

In an embodiment of the invention, the arrangement comprises a third alignment tool that protrudes less far from the part of the wind turbine than the second alignment tool.

The first two of the alignment tools abut on the counterpart of the part of the wind turbine, and secure the position of the part of the wind turbine in two directions. The part of the wind turbine can be brought closer to the counterpart. The third alignment tool abuts on the counterpart and secures the position of the part of the wind turbine in respect to the counterpart in a third direction.

Thus, the position of the part of the wind turbine in respect to the counterpart can be secured more precisely, to connect the part to the counterpart.

In an embodiment of the invention, the arrangement comprises at least one guide pin that is connected to a hole in a flange of the part of the wind turbine, and protrudes over the physical dimensions of the part of the wind turbine, and interacts with a hole in the counterpart during the alignment of the part of the wind turbine with the counterpart.

The part of the wind turbine and the counterpart might be, for example, segments of a tower or other parts of the wind turbine with a circular connection area. The part of the wind turbine and the counterpart have a longitudinal axis perpendicular to the plane of the connection between the part and the counterpart.

The part of the wind turbine and the counterpart can be fixed in their position by the alignment tools in a way that the longitudinal axes of, for example, the tower segments are aligned. Thus, a radial movement is eliminated.

Then, the part of the wind turbine needs to be rotated around its longitudinal axis until the rotational position is suitable to establish the connection.

The part of the wind turbine and its counterpart comprise a flange to establish the connection. The flange comprises bolt holes. The guide pin is connected to one of the bolt holes of the flange of the part of the wind turbine, and is suitable to reach into a hole of the flange of the counterpart.

The part of the wind turbine is rotated until the right rotational position is reached to establish the flange connection. In this position the guide pin reaches into the determined hole of the flange of the counterpart and fixes the rotational position until the connection by bolts is established at the flange.

Preferably, the guide pin comprises a longitudinal axis, and the guide pin is resilient in its axial direction and rigid in radial direction.

Thus, the guide pin can retract when a force is acting on the guide pin. The part of the wind turbine can be brought closer to the counterpart until the guide pin abuts on the counterpart and retracts in axial direction.

The part of the wind turbine is rotated until the position is reached where the bolt-holes at the flanges match. The guide pin will then extend and reach into the bolt hole of the counterpart.

Thus the rotational position of the part of the wind turbine can be fixed. Thus the connection of flanges can be established.

Preferably, the arrangement is detachably connected to the part of the wind turbine and is detached from the part of the wind turbine after the alignment of the part of the wind turbine and its counterpart.

The alignment tools and the guide pin are used during the installation of the wind turbine. After the connection between the part of the wind turbine and the counterpart is fixed, the arrangement is no longer needed at this connection.

The parts of the arrangement, namely the alignment tools and the guide pin, can then be detached from the part of the wind turbine and can be reused to establish a connection between another part of the wind turbine and its counterpart. Thus the arrangement can be reused. Thus material is saved.

In an embodiment of the invention, the alignment tool is prepared to be connected to a flange of the part of the wind turbine.

A part of a wind turbine is connected to a counterpart by a flange connection. Thus the flange is already present at the part of the wind turbine. A flange comprises holes for bolts. Not all bolts are present in the holes during the alignment of the part and the counterpart. Thus the holes can be used to attach the arrangement to the part of the wind turbine.

The flange of the part of the wind turbine can be used to attach the alignment tool and the guide pin to the part of the wind turbine. Thus no additional point to attach the arrangement is needed.

A method is disclosed to align a part of a wind turbine to a counterpart by using an arrangement, whereby the arrangement comprises an alignment tool. The alignment tool comprises a first area to be connected to a part of the wind turbine, and a second area that protrudes over the physical dimensions of the part of the wind turbine. The second area is arranged and prepared in a way that it abuts on the counterpart during the alignment of the part of the wind turbine and its counterpart. The arrangement comprises a second alignment tool, whereby the second alignment tool protrudes less far over the physical dimensions of the part of the wind turbine then the first alignment tool.

The method comprises the steps of abutting the first alignment tool to the counterpart, approaching the part of the wind turbine to the counterpart and, abutting the second alignment tool to the counterpart.

By abutting the first alignment tool to the counterpart, the position of the part in respect to the counterpart is fixed in a first direction. By abutting the second alignment tool the position can be fixed in a second direction.

Thus, a movement of the part of the wind turbine in respect to the counterpart is reduced or eliminated. Thus, the connection can be performed more easily and without the force of workers acting on the part of the wind turbine.

The method to align a part of a wind turbine to a counterpart, comprises the additional steps of moving the part of the wind turbine in a first direction with a constant distance to the counterpart until the first alignment tool abuts on the counterpart, and moving the part of the wind turbine in a second direction, different to the first direction, with a constant distance to the counterpart until the second alignment tool abuts on the counterpart.

Thus, the position of the part of the wind turbine is fixed in two directions in respect to the counterpart.

The arrangement comprises at least one guide pin, that is prepared and arranged to interact with a hole in a flange, and the method comprises the additional step of rotating the part of the wind turbine around an axis, that is oriented in the direction of the shortest distance between the part of the wind turbine and its counterpart, until the at least one guide pin is aligned with the hole in the flange in a way that the guide pin can be introduced into the hole in the flange.

Thus, the rotational position of the part of the wind turbine in respect to the counterpart can be fixed. Thus, the part of the wind turbine is aligned to the counterpart. Thus, a connection between the part and the counterpart can be established. The connection might be a flange connection, with bolt-holes. Thus, the bolt holes can be brought in alignment.

The use of the disclosed arrangement to align a part of a wind turbine to a counterpart is described.

The arrangement is used to align a part of a wind turbine to a counterpart, whereby the part of the wind turbine is a wind turbine tower or a wind turbine tower segment, or a nacelle, and the counterpart is a transition piece or a wind turbine tower segment.

Parts of a wind turbine like the tower, tower segment, or the nacelle are connected to a counterpart at the installation of a wind turbine. The parts are lifted by a crane to be connected to the counterpart. Thus, a movement, often a pendular movement is introduced into the parts. The movement needs to be eliminated to establish a connection between eh part and the counterpart.

Often the movement is reduced by workers introducing a force into the part of the wind turbine. The workers use ropes or sometimes their hands to eliminate the movement. This is a safety problem for the workers. In addition it takes a lot of force and some time to eliminate the movement and align the parts.

With the use of the arrangement the parts can be aligned easily and safely.

BRIEF DESCRIPTION

Some of the embodiments will be described in detail, with reference to the following figures, wherein like designations denote like members, wherein.

DETAILED DESCRIPTION

Figure 1:
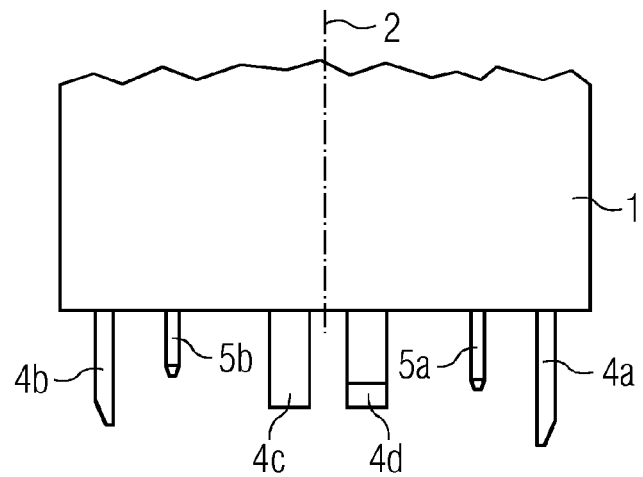
FIG. 1 shows an embodiment of an alignment system of a part of a wind turbine.

FIG. 1 shows an alignment system of a part of a wind turbine.

FIG. 1 shows an arrangement to align a part of a wind turbine to its counterpart. In the embodiment of FIG. 1, the part of a wind turbine is a wind turbine tower 1. The part of a wind turbine can also be a segment of a wind turbine tower 1 or a nacelle of a wind turbine.

The wind turbine tower 1 in FIG. 1 shows a longitudinal axis 2. At the lower end of the wind turbine tower 1 alignment tools are attached to the wind turbine tower 1.

An alignment tool 4a protrudes over the physical dimensions of the wind turbine tower 1 in a downward direction. A second alignment tool 4b protrudes over the physical dimensions of the wind turbine tower 1 in a downward direction, too.

FIG. 1 also shows a third alignment tool 4c that protrudes over the physical dimensions of the wind turbine tower 1 in a downward direction. Even a third alignment tool 4d is shown in FIG. 1.

The second alignment tool 4b protrudes over the physical dimensions more than the third alignment tool 4c. In addition, the first alignment tool 4a protrudes even further over the physical dimensions of the wind turbine tower 1 then the second alignment tool 4b.

In addition, FIG. 1 shows two guide pins 5a and 5b that protrude over the physical dimensions of the wind turbine tower 1, whereby the first guide pin 5a protrudes further over the physical dimensions than the second guide pin 5b.

Figure 2:
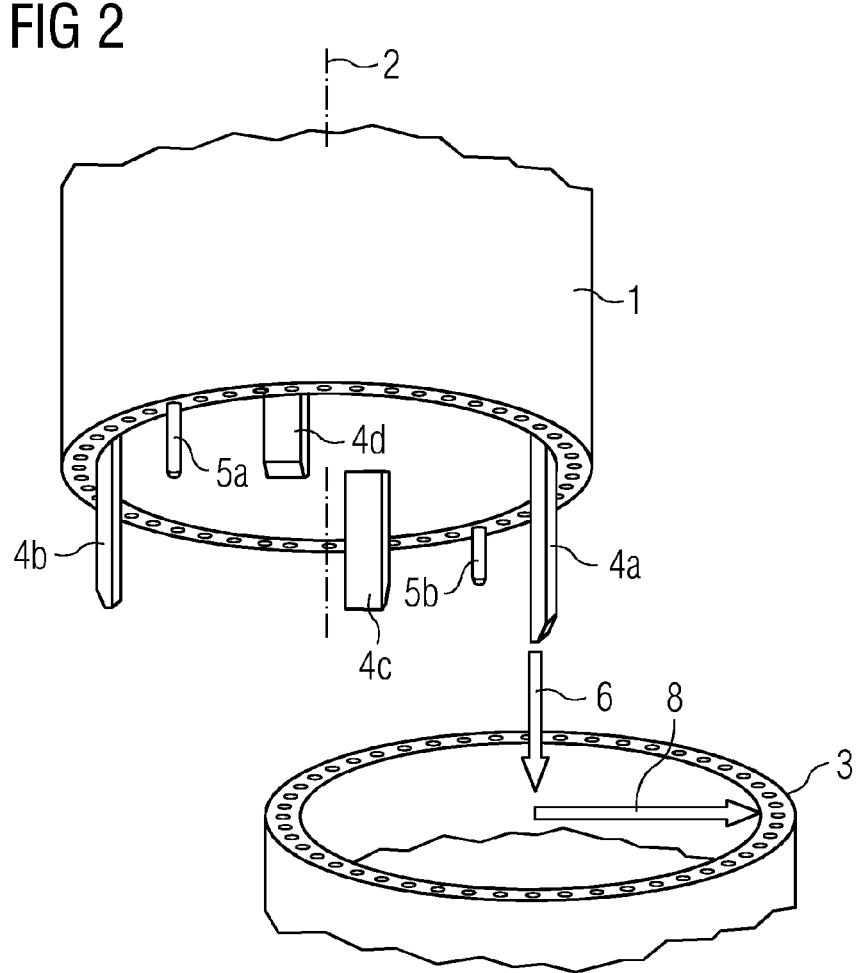
FIG. 2 shows an embodiment of a first step of aligning a part of a wind turbine to its counterpart.

FIG. 2 shows the first step of aligning a part of a wind turbine to its counterpart.

FIG. 2 shows a wind turbine tower 1 and its counterpart 3. The wind turbine tower 1 comprises a longitudinal axis 2. The counterpart 3 of the wind turbine tower 1 can be a transition piece of a monopole, for example, or a foundation in the ground of the installation site of the wind turbine.

The wind turbine tower 1 is brought closer to the counterpart 3 by a movement 6 in the direction of the longitudinal axis 2 of the tower 1.

In addition, the wind turbine tower 1 is moved towards the counterpart 3 with a radial movement 8 in the direction perpendicular to the longitudinal axis 2 of the wind turbine tower 1. The first alignment tool 4a will abut on the counterpart 3 when a distance between the wind turbine tower 1 and the counterpart 3 is smaller than the length of the alignment tool 4a protruding over the physical dimensions of the wind turbine tower 1.

The alignment tool 4a can thus stabilize the position of the wind turbine tower 1 in respect to the counterpart 3 in a first direction.

The second alignment tool 4b protrudes less far from the physical dimensions of the wind turbine tower 1 than the first alignment tool 4a.

The wind turbine tower 1 is moved towards its counterparts 3 in the direction 6 in parallel to the longitudinal axis 2 of the wind turbine tower 1.

In addition, the wind turbine tower 1 can be moved in a radial direction until the second alignment tool 4b abuts on the counterpart 3 of the wind turbine tower 1.

The second alignment tool 4b abuts on the counterpart 3 of the wind turbine tower 1 when the distance between a wind turbine tower 1 and its counterpart 3 is less than the length of the second alignment tool 4b that is protruding over the physical dimensions of the wind turbine tower 1.

Thus, the second alignment tool 4b can stabilize the position of the wind turbine tower 1 in respect to its counterpart 3 in a second direction.

Figure 3:
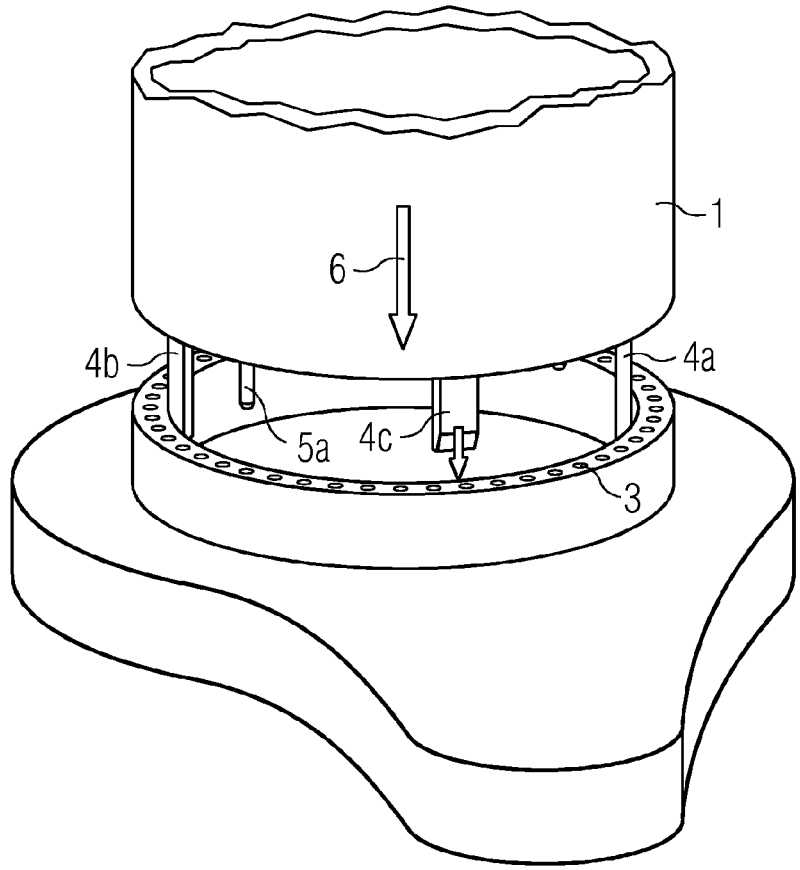
FIG. 3 shows an embodiment of a second step of aligning a part of a wind turbine tower to its counterpart.

FIG. 3 shows a second step of aligning a part of a wind turbine tower to its counterpart.

FIG. 3 shows a wind turbine tower 1 and its counterpart 3 whereby the wind turbine tower 1 comprises alignment tools 4a and 4b, that are connected to the wind turbine tower 1 and that abut on the counterpart 3 of the wind turbine tower 1.

The wind turbine tower 1 is then moved further into a direction 6 in parallel to the longitudinal axis 2 of the wind turbine tower 1 until the distance between the wind turbine tower 1 and its counterpart 3 is less than the length of the third alignment tool 4c protruding over the physical dimensions of the wind turbine tower 1.

Thus, the third alignment tool 4c abuts on the counterpart 3 of the wind turbine tower 1. The third alignment tool 4c then stabilizes the position of the wind turbine tower 1 in respect to its counterpart 3 in a third direction.

When the first alignment tool 4a, the second alignment tool 4b and the third alignment tool 4c abut on the counterpart 3 of the wind turbine tower 1, the position of the wind turbine tower 1 is fixed in respect to its counterpart 3 in the directions perpendicular to the longitudinal axis 2 of the wind turbine tower 1.

In addition a fourth alignment tool 4d can be used to stabilize the position of the tower 1 in respect to the counterpart 3.

Thus, the wind turbine tower 1 cannot be moved in a direction perpendicular to the longitudinal axis 2 of the wind turbine tower 1.

Figure 4:
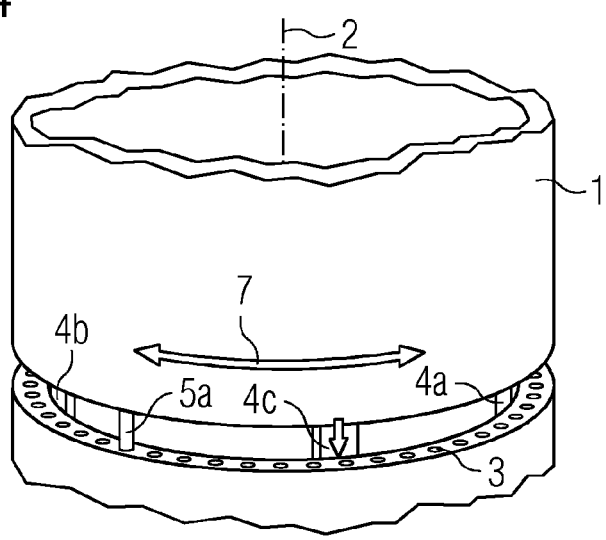
FIG. 4 shows an embodiment of a third step of aligning a part of a wind turbine tower to its counterpart.

FIG. 4 shows the third step of aligning a part of a wind turbine tower to its counterpart.

FIG. 4 shows the third step of aligning a wind turbine tower 1 to its counterpart 3.

The first alignment tool 4a, the second alignment tool 4b and the third alignment tool 4c abut on the counterpart 3 of the wind turbine tower 1. Thus, the wind turbine tower 1 cannot be moved in the direction perpendicular to the longitudinal axis 2 of the wind turbine tower 1 in respect to the counterpart 3.

The wind turbine tower 1 is then rotated in the direction 7 around the longitudinal axis 2 of the wind turbine tower 1 in respect to the counterpart 3, until a first guide pin 5a is aligned with a hole in a flange of the counterpart 3.

When the first guide pin 5a is aligned with the hole in the flange of the counterpart 3, the wind turbine tower 1 can be moved in a direction in parallel to the longitudinal axis 2, so that the first guide pin 5a can enter into the hole of the flange of the counterpart 3.

The wind turbine tower 1 is then fully aligned to its counterpart 3 and can be connected to the counterpart 3.

The illustration in the drawings is in schematic form. It is noted that in different figures, similar or identical elements are provided with the same reference signs.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. An arrangement to align a part of a wind turbine to a counterpart of the part of the wind turbine, comprising:
    a first alignment member, the first alignment member having a first area to be connected to the part of the wind turbine, and a second area that protrudes over the physical dimensions of the part of the wind turbine, the second area being arranged and prepared in a way that the second area abuts an inner surface of the counterpart during the alignment of the part of the wind turbine and the counterpart to limit a lateral movement of the part of the wind turbine; and
    a second alignment member, the second alignment member protruding less far over the physical dimensions of the part of the wind turbine than the first alignment member, so that the first alignment member abuts the counterpart before the second alignment member when the part of the wind turbine approaches the counterpart.

2. The arrangement according to claim 1, wherein the first alignment member and the second alignment member are bendable to elastically flex when a force is acting on the second area.

3. The arrangement according to claim 1, further comprising a third alignment member that protrudes less far from the part of the wind turbine then the second alignment member.

4. The arrangement according to claim 1, further comprising at least one guide pin, that is connected to a hole in a flange of the part of the wind turbine, and that protrudes over the physical dimensions of the part of the wind turbine, and interacts with a hole in the counterpart during the alignment of the part of the wind turbine with the counterpart.

5. The arrangement according to claim 4, wherein the at least one guide pin comprises a longitudinal axis, and that the at least one guide pin is resilient in an axial direction and rigid in a radial direction.

6. The arrangement according to claim 1, wherein the arrangement is detachably connected to the part of the wind turbine and is detached from the part of the wind turbine after the alignment of the part of the wind turbine and the counterpart.

7. The arrangement according to claim 1, wherein the first alignment member and the second alignment member are prepared to be connected to a flange of the part of the wind turbine.

8. A method comprising:
utilizing an arrangement according to claim 1 to align the part of the wind turbine to the counterpart.

9. The method according to claim 8, whereby the part of the wind turbine is at least one of a wind turbine tower, a wind turbine tower segment, and a nacelle, and the counterpart is at least one of a transition piece and a wind turbine tower segment.

10. A method to align a part of a wind turbine to a counterpart by using an arrangement, the arrangement comprising a first alignment member, the first alignment member having a first area to be connected to the part of the wind turbine, and a second area that protrudes over the physical dimensions of the part of the wind turbine, the second area being arranged and prepared in a way that the second area abuts an inner surface of the counterpart during the alignment of the part of the wind turbine and the counterpart to limit a lateral movement, further wherein the arrangement comprises a second alignment member, the second alignment member protruding less far over the physical dimensions of the part of the wind turbine than the first alignment member, wherein the method comprises the steps of:
abutting the first alignment member to the counterpart;
approaching the part of the wind turbine to the counterpart; and
abutting the second alignment member to the counterpart.

11. The method to align a part of a wind turbine to the counterpart according to claim 10, comprising the steps of:
moving the part of the wind turbine in a first direction with a constant distance to the counterpart until the first alignment member abuts on the counterpart; and
moving the part of the wind turbine in a second direction, different to the first direction, with a constant distance to the counterpart until the second alignment member abuts on the counterpart.

12. The method according to claim 10, wherein the arrangement comprises at least one guide pin, that is prepared and arranged to interact with a hole in a flange, comprising the additional step of:
rotating the part of the wind turbine around an axis, that is oriented in the direction of the shortest distance between the part of the wind turbine and the counterpart, until the at least one guide pin is aligned with the hole in the flange in a way that the at least one guide pin is introduced into the hole in the flange.

* * * * *